United States Patent [19]

Prete, Jr. et al.

[11] 4,185,360

[45] Jan. 29, 1980

[54] RATCHET BUCKLE FOR TIGHTENING AND TENSIONING STRAP

[75] Inventors: Ernest Prete, Jr., Woodland Hills; Herbert N. Clay, Mission Hills, both of Calif.

[73] Assignee: Ancra Corporation, El Segundo, Calif.

[21] Appl. No.: 933,137

[22] Filed: Aug. 14, 1978

[51] Int. Cl.² ............................................. A44B 21/00
[52] U.S. Cl. .................................. 24/68 CD; 254/164
[58] Field of Search ................ 24/68 CD, 68 R, 71.2, 24/77 R; 254/79, 51, DIG. 12, 164, 163, 169; 248/499

[56] References Cited

U.S. PATENT DOCUMENTS

| | | | |
|---|---|---|---|
| Re. 25,069 | 10/1961 | Elsner | 24/77 R |
| 2,874,431 | 2/1959 | Elsner | 24/71.2 X |
| 2,889,136 | 6/1959 | Prete, Jr. | 254/79 X |
| 2,993,680 | 7/1961 | Davis | 254/164 |
| 3,175,806 | 3/1965 | Prete, Jr. | 254/164 |
| 3,180,623 | 4/1965 | Huber | 24/71.2 X |
| 3,718,315 | 2/1973 | Huber | 254/164 |
| 3,749,366 | 7/1973 | Brucker | 254/164 |
| 3,826,473 | 7/1974 | Huber | 24/71.2 X |
| 4,118,833 | 10/1978 | Knox et al. | 24/68 CD |

Primary Examiner—Philip C. Kannan
Attorney, Agent, or Firm—Edward A. Sokolski

[57] ABSTRACT

A ratchet buckle for tightening and tensioning straps includes a bifurcated frame member having a pair of oppositely positioned parallel arms, between which a reel member and ratchet wheels are rotatably mounted. A strap to be tensioned is reeved through the reel member. A bifurcated lever member having a pair of oppositely positioned parallel arms is rotatably mounted on the reel and has a ratchet drive plate which engages the teeth of the ratchet wheels such that when the lever is actuated, the reel is rotatably driven. A latching plate is mounted on the frame which engages the ratchet wheels to latch these wheels at times when they are not being rotated by virtue of driving action of the lever. This latching plate is secured in position and prevented from unseating from engagement with the teeth of the ratchet wheels by virtue of the engagement of an undercut portion of the latching plate with retaining and camming elements formed on the lever. Further, notches are formed in the arms of the frame into which a cross member, which runs between the arms of the lever, fits and is seated, such that a portion of the load on the frame is transferred into the lever when the buckle is in the closed position.

2 Claims, 4 Drawing Figures

RATCHET BUCKLE FOR TIGHTENING AND TENSIONING STRAP

This invention relates to ratchet buckles for tightening and tensioning straps, and more particularly to such a buckle which is used to tighten a strap by means of a ratchet mechanism which employs a securing mechanism for retaining the strap in a tensioned condition.

Ratchet buckles for tightening and/or tensioning straps are described in U.S. Pat. No. 2,889,136, issued June 2, 1959 to E. Prete Jr., the co-inventor of the present invention, and Pat. No. Re. 25,069 issued Oct. 31, 1961 to E. C. Elsner. This type of ratchet buckle mechanism is quite effective in tensioning straps; however, it has been found that in certain situations when subjected to high vibration or jarring, or when subjected to the cyclical application of tensile loads, that the latching mechanisms of these prior art devices can move out of the ratchet teeth, thereby prematurely releasing the tensile load.

The present invention is an improvement over prior art ratchet buckles of the type described in the aforementioned patents, wherein positive securing of the latching plate is provided when the device is in its final closed position, to obviate the aforementioned shortcomings of the prior art devices. This end result is achieved without in any way adversely affecting the operation of the device while the strap is being tightened. Further, means are provided in the present invention for transferring part of the load on the frame into the handle when the device is in the finally closed position, thus substantially increasing the strength-to-weight ratio of the device.

Positive securing of the ratchet buckle in the finally tensioned condition is achieved in a simple yet highly effective manner by providing undercut portions in the outer surfaces of the arms of the latching plate, with which camming and securing projections formed on the arms of the lever engage when the lever is in the "down" or finally closed position. These camming and securing projections drive the latching plate arms positively to firmly seated positions in the ratchet wheels and retain these arms in the seated position even in the face of high vibration and cyclic changes in tensile loading. The transfer of a portion of the load from the frame member to the handle is achieved by providing a cross member which runs between the arms of the handle, which seats in notches formed in the arms of the frame when the lever or handle is in its final closed position.

It is therefore an object of this invention to prevent the inadvertent release of a ratchet buckle from its finally tensioned position when subjected to vibrational or cyclic loads.

It is a further object of this invention to provide positive yet simple and economical means for retaining the latching mechanism of a ratchet buckle in its finally tensioned condition.

It is still a further object of this invention to provide means for transferring a portion of the load on a ratchet buckle from the ratchet buckle frame to the operating lever.

Other objects of this invention will become apparent as the description proceeds in connection with the accompanying drawings, of which:

Figure 1:
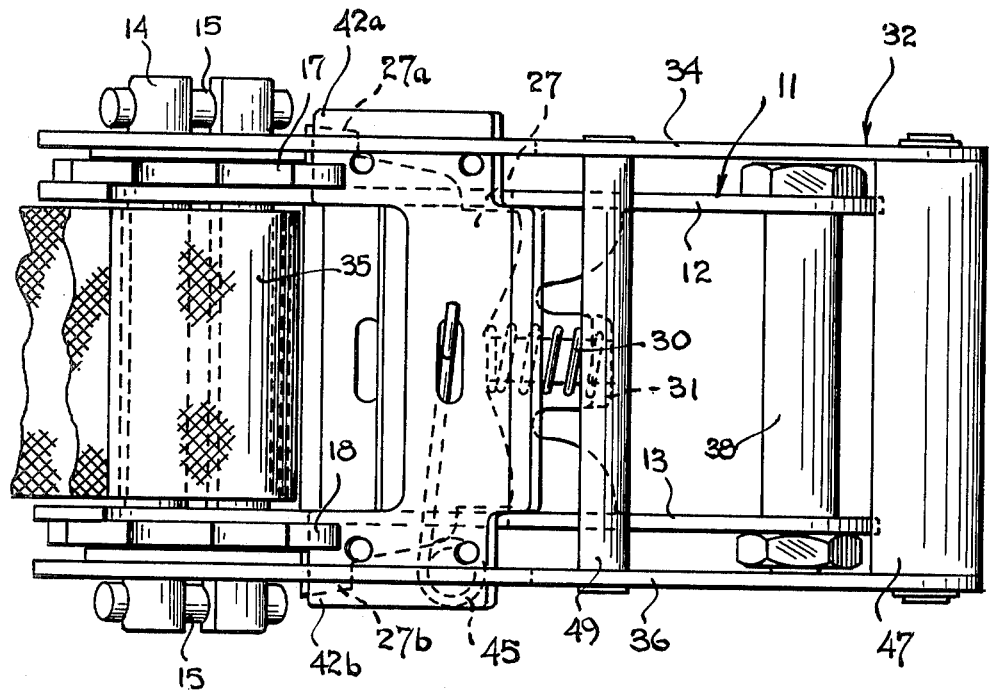
FIG. 1 is a top plan view of a preferred embodiment of the invention.

The general features of the device of the present invention are basically the same as that described in the aforementioned patents, and therefore will be only briefly described herein except for the special features of improvement provided. The device of the invention includes a bifurcated frame member 11 which has a pair of oppositely positioned parallel arms 12 and 13. Reel member 14 is formed from a pair of bars which are joined together at their end portions by means of pins 15, and is rotatably mounted on frame 11 between arms 12 and 13. Mounted on reel 14 in fixed positions relative thereto are a pair of ratchet wheels 17 and 18, these ratchet wheels having web portions 20 which run between the bars of reel 14 and thus prevent rotation of the wheels relative to the reel.

Mounted for longitudinal motion in slots 25 shaped in arms 12 and 13 of the frame is a latching plate 27. Latching plate 27 is undercut to form a pair of arm portions 27a and 27b and latching surfaces 27c facing substantially opposite to the direction in which the plate 27 extends into the ratchet wheels 17 and 18. Latching plate 27 is slidably urged by means of spring 30 which abuts at one end thereof against bracket 31 formed in the frame and at the other end against the body of the latching plate. This spring action forces the ends of arm portions 27a and 27b against ratchet wheels 17 and 18 and holds the wheels in a latched condition at times other than when lever member 32 is being lifted away from frame member 11.

Figure 2:
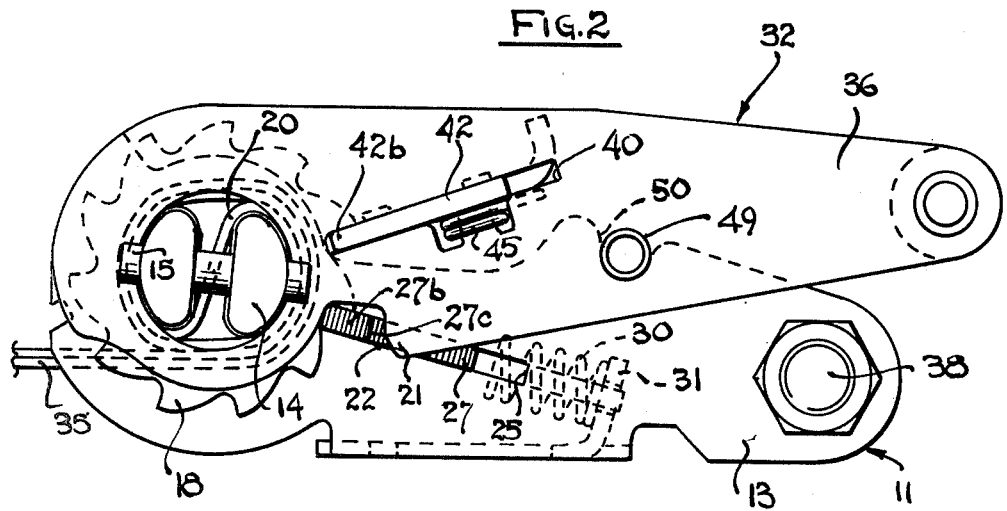
FIG. 2 is a side elevational view of the preferred embodiment.
Figure 3:
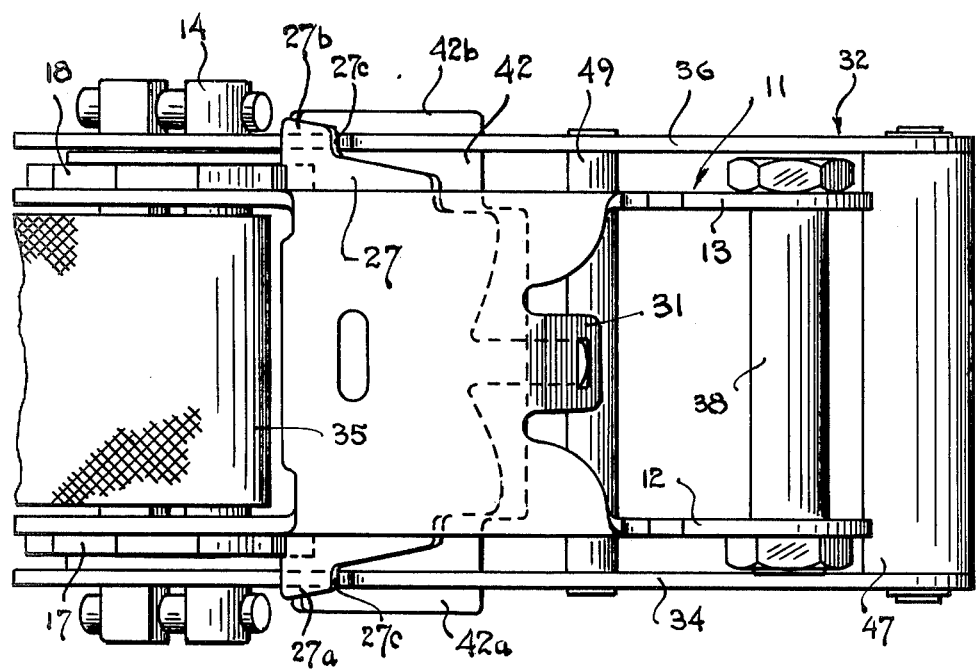
FIG. 3 is a bottom plan view of the preferred embodiment.

A strap member to be tensioned is wound around reel 14 as lever member 32 is raised and lowered relative to frame 11. A bar member 38 runs between arms 12 and 13 and is fixedly attached or anchored to a member relative to which the strap is to be tensioned, as for example the wall of a vehicle. Lever member 32 has a pair of oppositely positioned parallel arms 34 and 36, these arms being rotatably supported in reel 14 between ratchet wheels 17 and 18 and pins 15. Slidably mounted in elongated slot 40 shaped in arms 34 and 36 is a ratchet drive plate 42, this plate having a pair of arms 42a and 42b which engage ratchet wheels 17 and 18 in response to the urging of spring 45 against drive plate 42. Lever 32 further has a handle 47 to facilitate the manual movement thereof relative to frame 11, and a cross member 49 which rests in notches 50 formed in frame 11 when the lever is in its finally closed position (as shown in FIGS. 1–3). This engagement between the lever and the frame transfers some of the load from the frame to the lever and thus effectively increases the load capacity of the device by combining the structures of the lever and the frame in handling loads placed on the device by the strap. Projections 21 are formed along the inner edges of lever arms 34 and 36, these projections having camming surfaces 22 along their outer periphery.

Figure 4:
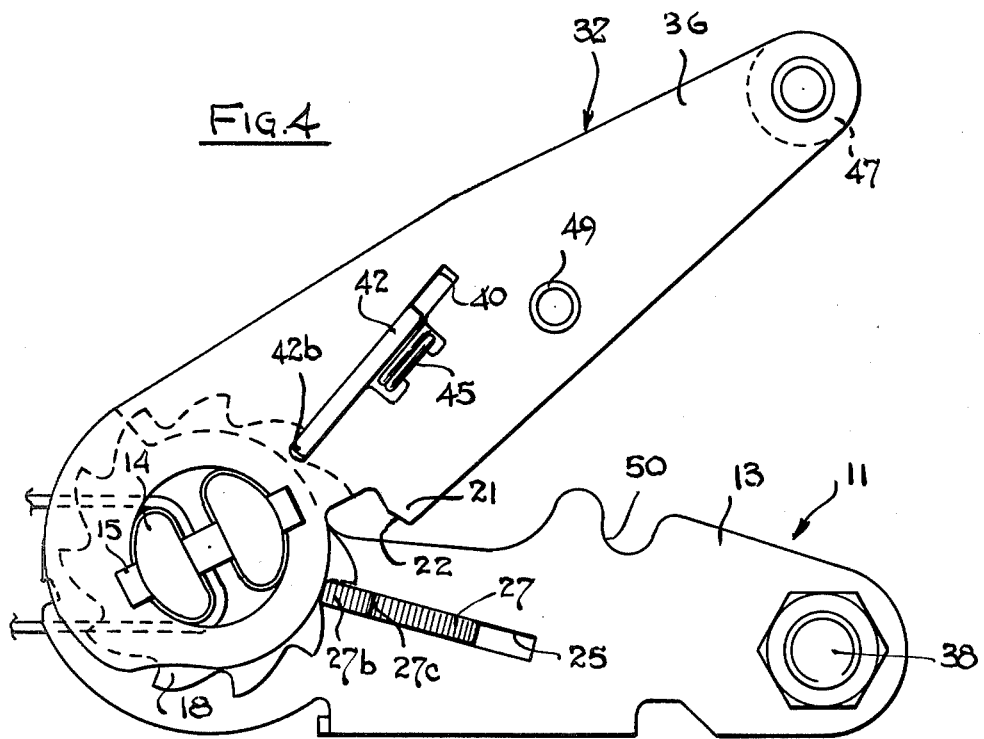
FIG. 4 is a side elevational view of the preferred embodiment shown while being employed to tighten a strap.

In operation, strap 35 is tensioned by raising and lowering lever 32 relative to frame 11, ratchet drive plate 42 driving the ratchet wheels as shown in FIG. 4 as the lever is moved upwardly, latching plate 27 retaining the ratchet wheels in position while the lever is moved downwardly over the arcuate portions of the ratchet wheel teeth. When the finally tensioned condition is reached, lever 32 is placed downwardly in the closed (locked) position shown in FIG. 2. As the lever enters this position, camming surfaces 22 formed at the extremities of securing projections 21 abut against latching surfaces 27c formed in the latching plate and drive the arms 27a and 27b of the plate into firm engagement with the ratchet wheels. Once driven into this position, the latching plate is prevented from being unseated from its latched position against the ratchet wheels by securing projections 21, even in the face of high vibration and cyclic changes in tensioning. As already noted, in the closed position pin member 49 is seated in notches 50 which effectively joins the lever and the frame together insofar as tensile loads imparted by strap 35 are concerned.

While the invention has been described and illustrated in detail, it is to be clearly understood that this is intended by way of illustration and example only and is not to be taken by way of limitation, the spirit and scope of this invention being limited only by the terms of the following claims.

We claim:

1. In a ratchet buckle for use in tightening and tensioning strap including a frame member with a pair of oppositely positioned arms, a reel member rotatably supported between said arms, a pair of ratchet wheels being rotatably mounted between said arms and fixedly attached to said reel member in spaced apart relationship, and a latching plate slidably mounted between said arms for latching said ratchet wheels when they are not being rotatably driven, the strap being wound around said reel member; and a lever member having a pair of oppositely positioned arms rotatably mounted on the reel member and a ratchet drive plate slidably mounted between the lever member arms which engages and drives said ratchet wheel when the lever member is actuated, the improvement being means for securing the latching plate in position firmly against the teeth of said ratchet wheels when the lever member is in a predetermined finally closed position relative to the frame member, comprising:

undercut portions forming latching surfaces in the outer edge portions of said latching plate, said surfaces facing in a direction substantially opposite to that in which the latching plate extends towards said ratchet wheels, and projections formed along the inner edges of the lever arms, said projections being positioned directly opposite said latching surfaces and having camming surfaces formed along the outer periphery thereof, said camming surfaces extending at an angle away from the latching surfaces with the lever member in said predetermined finally closed position, whereby when the lever member is moved towards said predetermined finally closed position the camming surfaces of said projections abut against the latching surfaces to drive the latching plate into firm engagement with the teeth of the ratchet wheels, the latching plate being secured in engagement with said wheels by said projections when the lever member is in said closed position.

2. In a ratchet buckle for use in tightening and tensioning strap including a frame member with a pair of oppositely positioned arms, a reel member rotatably supported between said arms, a pair of ratchet wheels fixedly attached to said reel member in spaced apart relationship, and a latching plate slidably mounted between said arms for latching said ratchet wheels when they are not being rotatably driven, the strap being wound around said reel member; and a lever member having a pair of oppositely positioned arms rotatably mounted on the reel member and a ratchet drive plate slidably mounted between the lever member arms which engages and drives said ratchet wheel when the lever member is actuated, the improvement being means for securing the latching plate in position firmly against the teeth of said ratchet wheels when the lever member is in a predetermined final closed position relative to the frame member comprising:

undercut portions forming latching surfaces in the outer edge portions of said latching plate, said surfaces facing in a direction opposite to that in which the latching plate extends towards said ratchet wheels, projections formed along the inner edges of the lever arms, said projections having camming surfaces positioned directly opposite said latching surfaces so as to secure the latching plate in engagement with the ratchet wheels when the lever member is in said predetermined final position, notches formed in the inner edges of said frame member, and a cross member extending between the arms of said lever member, said cross member fitting into said notches to provide structural reinforcement of said frame member by said lever member when the lever member is in said predetermined finally closed position, whereby when the lever member is moved towards said predetermined finally closed position the camming surfaces of said projections abut against the latching surfaces to drive the latching plate into firm engagement with the teeth of the ratchet wheels, the latching plate being secured in engagement with said wheels by said projections when the lever member is in said closed position.

* * * * *